June 14, 1927.
W. S. MYERS
1,632,711
LINE CHALKING DEVICE
Filed June 14, 1926
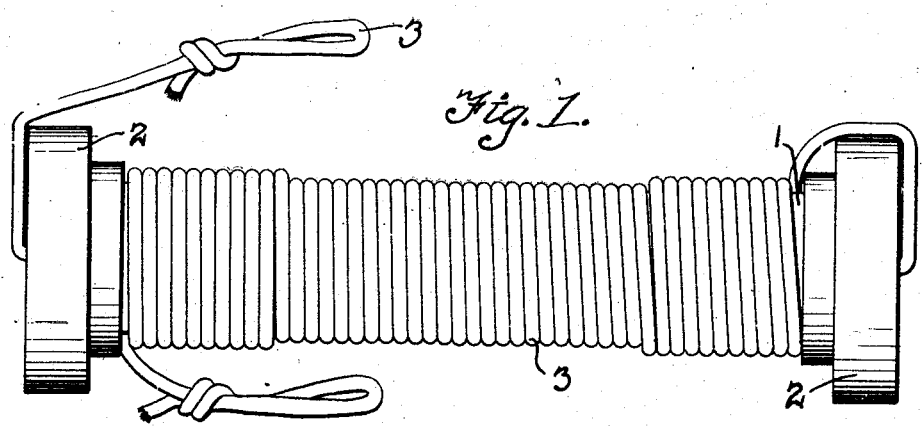
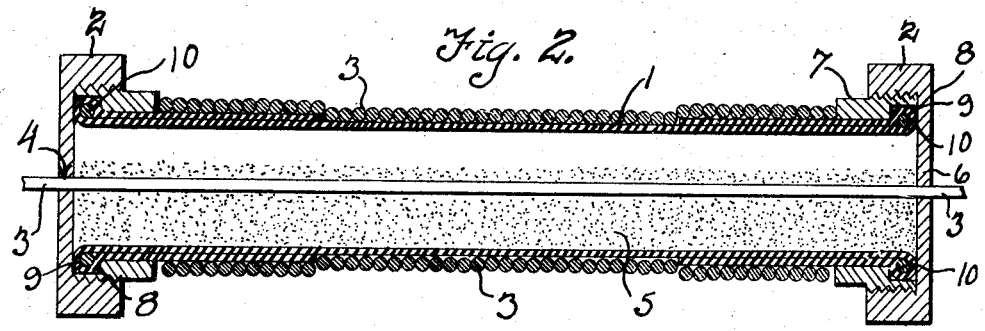
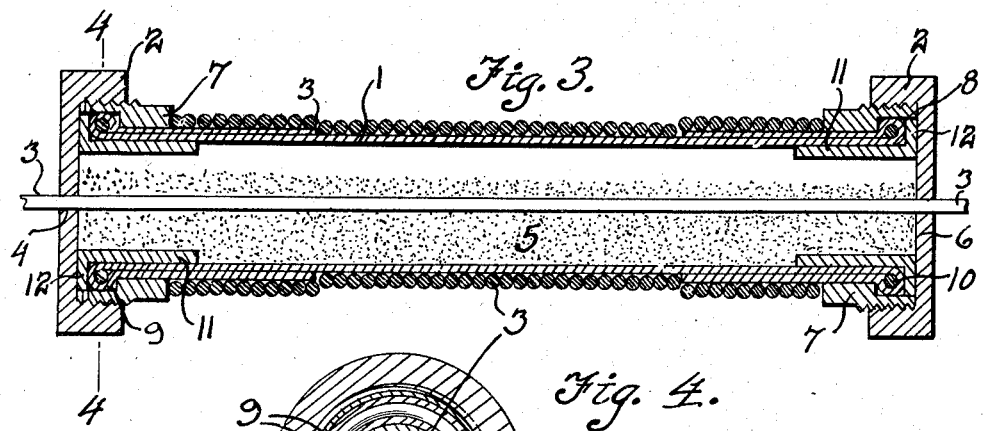
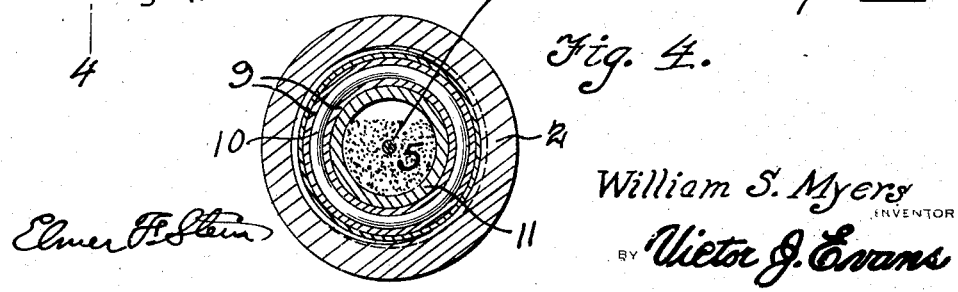
William S. Myers
INVENTOR
BY Victor J. Evans
ATTORNEY
WITNESS:

Patented June 14, 1927.

1,632,711

UNITED STATES PATENT OFFICE.

WILLIAM S. MYERS, OF ST. PETERSBURG, FLORIDA.

LINE-CHALKING DEVICE.

Application filed June 14, 1926. Serial No. 115,946.

This invention relates to a chalk line reel and chalk holder, the general object of the invention being to provide a reel formed with a container part to hold powdered chalk, with means for permitting the line to be passed through said container part to contact with the chalk as it passes through the same.

Another object of the invention is to make the container part of flexible material so that the same can be compressed to cause the chalk to contact with the line and to keep the chalk in powdered form.

A further object of the invention is to so form the device that its length can be increased or decreased, as desired.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the device.

Figure 2 is a longitudinal sectional view through the device.

Figure 3 is a similar view through a modified form of device.

Figure 4 is a section on line 4—4 of Figure 3.

In these views, 1 indicates a cylindrical member which is formed of flexible and waterproof material, such as rubberized cloth rubber or the like and 2 indicates the end pieces for closing the ends of the cylinder, and these end pieces and the cylinder form a reel for the chalk line 3. Each end piece is provided with a centrally arranged hole 4 so that the line can pass through the reel and come in contact with the powdered chalk 5 placed therein, so that the line will be supplied with chalk. Each end piece 2 is formed of a cup-shaped member 6 and a ring-shaped member 7 which is threaded in the cup-shaped member and the outer end of each ring-shaped member is provided with an annular recess 8 to receive the folded part 9 of the cylinder 1 which is folded over a ring 10. Thus the ring will hold the folded end of the cylinder in the recess 8 of the part 7 and the part 6, when screwed on the part 7, will firmly hold the parts assembled. The surplus material of the member 1 overlaps the end part of the member, as shown in Figures 2 and 3.

In Figure 3, a sleeve or thimble 11 is placed in each end of the reel and has a flange 12 at its outer end extending into the recess in part 7 so that this sleeve and its flange holds the looped end of the cylinder in engagement with the end member.

In both forms of the device, the length of the cylinder can be adjusted by turning the ends over more or less so that the size of reel can be regulated according to the amount of line to be placed thereon. As before stated, the line passing through the powdered chalk will be kept covered with chalk and by squeezing the cylinder, the chalk will be pressed upon the line and any lumps forming in the chalk will be broken up.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A chalk line reel comprising a cylinder formed of flexible material and having its ends looped so that it can be adjusted as to its length, end members for closing the ends of the cylinder, each member having a hole therein for the passage of the chalk line and means for connecting the end members with the cylinder.

2. A chalk line reel comprising a cylinder formed of flexible material having its walls looped back at the ends, a ring in each looped part, a pair of end pieces, each piece being formed of two sections threaded together, the inner section having an annular groove therein for receiving the ring carrying part of the looped portion of the cylinder and each end piece having a hole therein for the passage of the chalk line.

3. A chalk line reel comprising a cylinder formed of flexible material having its walls looped back at the ends, a ring in each looped part, a pair of end pieces, each piece being formed of two sections threaded together, the inner section having an annular groove therein for receiving the ring carrying part of the looped portion of the cylinder and each end piece having a hole therein for the passage of the chalk line and a flanged sleeve fitting within each end of the cylinder for holding the looped portion within the groove.

In testimony whereof I affix my signature.

WILLIAM S. MYERS.